(12) United States Patent
Lifson et al.

(10) Patent No.: US 7,353,660 B2
(45) Date of Patent: Apr. 8, 2008

(54) MULTI-TEMPERATURE COOLING SYSTEM WITH UNLOADING

(75) Inventors: Alexander Lifson, Manlius, NY (US); James W. Bush, Skaneateles, NY (US)

(73) Assignee: Carrier Corporation, Farmington, CT (US)

( * ) Notice: Subject to any disclaimer, the term of this patent is extended or adjusted under 35 U.S.C. 154(b) by 435 days.

(21) Appl. No.: 10/940,235

(22) Filed: Sep. 13, 2004

(65) Prior Publication Data

US 2006/0053811 A1    Mar. 16, 2006

(51) Int. Cl.
*F25B 5/00*    (2006.01)
*F25B 1/10*    (2006.01)

(52) U.S. Cl. .......................................... 62/199; 62/510

(58) Field of Classification Search ................ 62/199, 62/510, 498, 196.3, 197, 196.2, 117
See application file for complete search history.

(56) References Cited

U.S. PATENT DOCUMENTS 3,577,742 A * 5/1971 Kocher ........................ 62/199
4,565,072 A * 1/1986 Fujiwara et al. ........... 62/196.2
5,065,591 A   11/1991 Shaw

* cited by examiner

*Primary Examiner*—Chen Wen Jiang
(74) *Attorney, Agent, or Firm*—Bachman & LaPointe, P.C.

(57) ABSTRACT

A compressor has an inlet, an outlet, and at least an intermediate first port therebetween. A condenser is coupled to the compressor to receive refrigerant. First and second evaporators are coupled to the condenser to receive refrigerant. Conduits define a return flowpath from the first evaporator to the compressor inlet and a second return flowpath from the second evaporator to the intermediate port. A bypass conduit extends between a first location between the first evaporator and the compressor inlet and a second location between the second evaporator and the first port.

21 Claims, 2 Drawing Sheets

MULTI-TEMPERATURE COOLING SYSTEM WITH UNLOADING

BACKGROUND OF THE INVENTION (1) Field of the Invention

The invention relates to cooling. More particularly, the invention relates to multi-temperature cooling systems.

(2) Description of the Related Art

Multi-temperature cooling systems are known in the art. Such systems cool multiple locations to multiple different temperatures. A separate evaporator may be located at each location. U.S. Pat. No. 5,065,591 illustrates a multi-temperature system featuring several compressors and a single condenser.

SUMMARY OF THE INVENTION

One aspect of the invention involves an apparatus including a compressor having an inlet and an outlet and at least a first port between the inlet and the outlet. A condenser has an inlet and an outlet, the inlet coupled to the compressor outlet to receive refrigerant. A first evaporator has an inlet and an outlet, the inlet coupled to the condenser to receive refrigerant and the outlet coupled to the compressor inlet. A second evaporator has an inlet and an outlet, the inlet coupled to the condenser to receive refrigerant and the outlet coupled to the first port to return refrigerant to the compressor bypassing a compression path between the compressor inlet and first port. A bypass conduit extends between: a first location between the first evaporator and the compressor inlet; and a second location between the second evaporator and the first port. A first valve is positioned to directly control flow through the bypass conduit.

In various implementations, a second valve may be positioned to directly control flow between the second location and the first port. The first and second valves may be solenoid valves. A control system may be coupled to the first and second valves to control operation of the first and second valves. The first and second valves may be operated to substantially remain open or closed for times greater than a characteristic cycle time of the system. The compressor may be a scroll-type compressor. The apparatus may have only a single such compressor. A control system may be coupled to the first valve to control operation of the first valve. The control system may be configured to alternatively operate the apparatus in first and second modes. In the first mode, the first valve is closed, the first evaporator maintains a first space at a first characteristic temperature, and the second evaporator maintains a second space at a second characteristic temperature at least 10° C. higher than the first characteristic temperature. In the second mode, the first valve is open, the first evaporator maintains the first space at a first characteristic temperature, and the second evaporator maintains the second space at a second characteristic temperature within 5° C. of the first characteristic temperature. The control system may be configured to switch the apparatus from the first mode to the second mode responsive to a setting change of a thermostat in at least one of the first and second spaces. The first and second spaces may respectively be first and second spaces of a refrigerated vehicle. At least one heat exchanger may exchange heat to refrigerant discharged by the compressor from refrigerant discharged by at least one of the first and second evaporators. A first heat exchanger may exchange heat to refrigerant discharged by the compressor from refrigerant discharged by the first evaporator and a second heat exchanger may exchange heat to refrigerant discharged by the compressor from refrigerant discharged by the second evaporator. A donor conduit of the first heat exchanger may be downstream of a donor conduit of the second heat exchanger along a refrigerant flowpath portion extending downstream from the compressor. A refrigerant flowpath portion extending downstream from the compressor may branch into first and second branches. The first branch may extend through a donor conduit of the first heat exchanger, the first evaporator, and a recipient conduit of the first heat exchanger. The second branch may extend through a donor conduit of the second heat exchanger, the second evaporator, and a recipient conduit of the second heat exchanger. The apparatus may include an economizer having a feedback flowpath segment from downstream of the second evaporator to upstream of the first and second evaporators.

Another aspect of the invention involves an apparatus having means for compressing a refrigerant and having a compression path between inlet and outlet ports and an intermediate port at an intermediate location along the compression path. The apparatus includes a condenser and first and second evaporators. Means couple the inlet, outlet, and intermediate ports, condenser, and first and second evaporators so as to operate the first evaporator at a first temperature and the second evaporator at a second temperature lower than the first temperature and accommodate changes in a desired difference between the first and second temperatures.

In various implementations, the means for coupling may include a bypass valve along a bypass flowpath between: a first flowpath from the first evaporator to the intermediate port; and a second flowpath from the second evaporator to the suction port. The means may include a second valve in the first flowpath between the bypass flowpath and the intermediate port. Each opening and closing of the bypass valve and second valve may be responsive to at least one of a sensed condition or a user input.

Another aspect of the invention involves a method for cooling first and second locations. A refrigerant is compressed with a compressor having a compression path between an inlet port and an outlet port. The compressed refrigerant is condensed. A first portion of the condensed refrigerant is expanded in a first evaporator to cool the first location. A second portion of the condensed refrigerant is expanded in a second evaporator to cool the second location. In the first mode of operation, at least a portion of refrigerant from the second evaporator is returned to the inlet port of the compressor and at least a portion of refrigerant from the first evaporator is returned to an intermediate port between the compressor inlet and outlet ports. In a second mode of operation, at least a portion of refrigerant from the first evaporator is returned to the inlet port and at least a portion of refrigerant from the second evaporator is returned to the inlet port.

In various implementations, there may be a third mode of operation. In the third mode, a recirculating flow of refrigerant from the intermediate port to the inlet port may be permitted and at least a portion of refrigerant may be returned from the first evaporator to the inlet port and at least a portion of refrigerant from the second evaporator may be returned to the inlet port. In the first mode of operation, essentially all refrigerant from the second evaporator may be returned to the inlet port and essentially all refrigerant from the first evaporator may be returned to the intermediate port. In the second mode of operation, essentially all refrigerant from the first evaporator may be returned to the inlet port and essentially all refrigerant from the second evaporator may be returned to the inlet port. An economizer portion of the refrigerant from at least one of the evaporators may be fed back.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
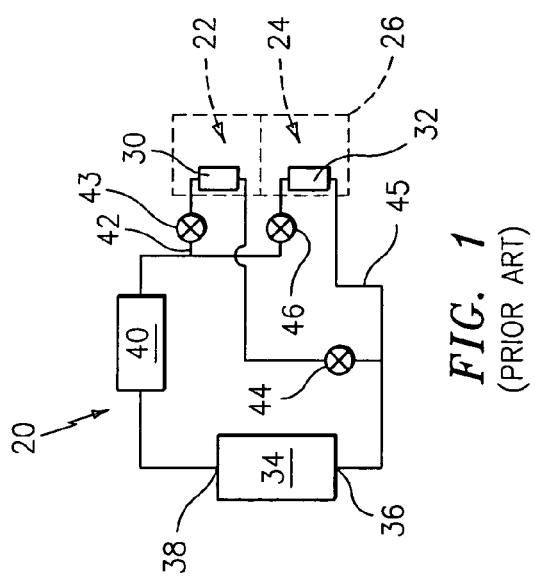
FIG. 1 is a schematic view of a prior art system.

FIG. 1 shows a prior art system 20 for cooling first and second locations (spaces/volumes) 22 and 24. Exemplary first and second locations are higher and lower temperature compartments of a refrigerated container 26. In the exemplary system, first and second evaporators 30 and 32 are respectively located within the compartments. To provide refrigerant to the evaporators, a single compressor 34 receives refrigerant through a suction (inlet) port 36 and discharges the refrigerant through a discharge (outlet) port 38. From the discharge port, the refrigerant passes to a condenser 40. From the condenser, the refrigerant output branches to split between the evaporators. A first branch 42 extends through a first expansion valve 43, the first evaporator 30, and a throttle valve 44. A second branch 45 runs through a second expansion valve 46 and the second evaporator 32 before joining the first branch to return to the suction port 36. Refrigerant exiting the low temperature evaporator 32 may thus return directly to the suction port 36. Refrigerant exiting the higher temperature evaporator 30 passes through the throttle valve 44 before returning to the suction port. By operating at a higher temperature, the evaporator 30 outputs refrigerant at a higher temperature and pressure than does the lower temperature evaporator 32. The valve 44 provides a step down between the two pressures. The throttling process associated with the valve 44 represents an inefficiency.

Figure 2:
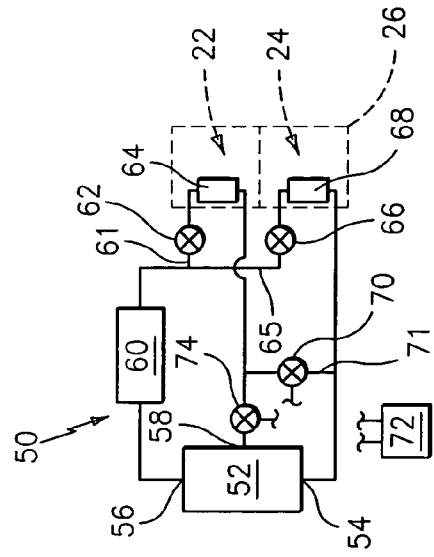
FIG. 2 is a schematic view of a first system according to principles of the invention.

FIG. 2 shows an alternate system 50 for cooling the locations 22 and 24. The system includes a compressor 52 having suction and discharge ports 54 and 56 defining a compression path therebetween. At an intermediate location along the compression path, the compressor includes an intermediate port 58. Refrigerant discharged from the discharge port 56 passes through a condenser 60 and, therefrom, is split along two branches. A first branch 61 passes through a first expansion valve 62 and a high temperature evaporator 64 and returns to the intermediate port 58. A second branch 65 passes through an expansion valve 66 and a low temperature evaporator 68 and returns to the suction port 54. The location of the intermediate port 58 along the compression path is chosen so that the pressure at this port will correspond to the desired outlet pressure of the high temperature evaporator. With screw-type and scroll-type compressors, there may be broad freedom to optimize the exact location of the intermediate port and potentially configure the compressor so that one or more of several locations may be selected during or after installation. With reciprocating compressors, the intermediate port may conveniently be located in the interstage of a multistage compressor. In such a situation, the sizes of the stages may be chosen to provide a desired intermediate pressure.

A bypass valve 70 is located in a bypass conduit 71 coupling the first branch 61 to the second branch 65 between the evaporator 64 and intermediate port 58 at one end and the evaporator 68 and suction port 54 at the other end. A control system 72 may be coupled to the bypass valve 70 to control opening and closing of the bypass valve. An exemplary bypass valve 70 is a solenoid valve. Optionally, a second valve 74 (e.g., also a solenoid valve) may be positioned in the first branch 61 between the first end of the bypass conduit 71 and the intermediate port 58. The second valve 74 may be similarly coupled to the control system 72. The control system 72 (e.g., a general purpose or specifically-configured computer, microcontroller, or the like) may be coupled to various sensors and user input devices (e.g., suction and discharge pressure sensors, evaporator temperature sensors, thermostats, and the like) to receive input and to the compressor motor to control compressor operation.

In a basic mode of operation, the bypass valve 70 is shut and the second valve 74 (if any) is open. If the evaporators 64 and 68 are, however, operated at saturated temperatures substantially close to each other, operation in the basic mode will be inefficient or otherwise impractical. The refrigerant entering the intermediate port 58 is necessarily at a higher pressure than at the suction port 54 since it is partway along the compression process. The two evaporators cannot be at saturation pressures (and thus temperatures) substantially close to each other.

A second mode of operation involves opening the bypass valve 70. Opening the bypass valve 70 allows the two evaporators to balance out with each other first by connecting them together without any intermediate restrictions and second by venting excess pressure from the intermediate port 58 back to the low pressure suction port 54. Flow exiting the evaporator 64 will pass from the first branch 61 to the second branch 65 through the bypass conduit 71 and, therefrom, to the suction port 54. Additionally, there will be a recirculating flow exiting the intermediate port 58 into the first branch 61 and also returning to the suction port 54 through the bypass conduit 71. In this mode, both evaporators are thus operated at the same condition as each other. The recirculating flow reduces the total refrigerant flow through the evaporators to provide a relatively low total cooling. Because some of the flow which has entered the compressor through the suction port 54 has been vented out of the intermediate port 58 and recirculated back to the suction port 54, the net mass flow through the compressor has been reduced. This is desirable when the net cooling demand from both evaporators is low. It will also result in reduced power consumption at the compressor since the bypassed vapor does not go through the full compression process.

A third mode of operation is possible when the second valve 74 is included. In this third mode, the bypass valve 70 is open and the second valve 74 is closed. The closing of the second valve 74 prevents the recirculating flow of the second mode. As in the second mode, the evaporators are operated in parallel at the same condition. However, the total refrigerant flow is high with the compressor being fully utilized. This provides relatively high total cooling.

An exemplary implementation is in a vehicle such as a two-compartment refrigerated truck or truck trailer. In the first mode, evaporator 64 is at a higher temperature condition (e.g. to transport fresh produce in the compartment 22) and evaporator 68 is at a lower temperature (e.g., to transport frozen food in the compartment 24). The system may be shifted to the second mode to provide a low-capacity operation when both evaporators are at the same or a near-same condition (e.g. to run both compartments at a higher temperature/pressure condition for transporting fresh produce in both). The system may be shifted to the third mode to provide a high capacity mode of operation when both evaporators are at the same or a near-same condition (e.g., to run both compartments at a lower temperature/pressure condition for transporting frozen foods in both). This essentially gives the option of using both compartments together for frozen or non-frozen products or for using one compartment for frozen and the other for non-frozen products.

With the second valve 74, a fourth mode is possible. In this fourth mode, both the bypass valve 70 and the second valve 74 are closed. There is no flow through the first branch 61 (either through the evaporator 64 or the recirculating flow). This effectively shuts off the evaporator 64 so that the full output of the compressor passes through the evaporator 68. This fourth mode may have potential uses in very specific implementations. For example, in the refrigerated trailer situation, it may be used when there is a small refrigerated cargo that can fit into compartment 24 leaving compartment 22 unrefrigerated (e.g., if empty or containing non-perishables).

In the exemplary implementation, the bypass valve 70 and the second valve 74 are, by their construction or operation, bistatic (i.e., either fully open or fully closed as opposed to having a continuum or progression of intermediate states of openness such as for throttling). The bypass valve 70 and the second valve 74 are cycled relatively slowly (e.g., as opposed to rapidly cycled bistatic valves modulated at high speed with a duty cycle chosen to simulate throttling). Thus, the valves may be opened or closed responsive to detected condition changes or to input changes (rather than faster than any such changes). The valves may remain open or closed for periods longer than the period required for refrigerant to cycle through the system. For example, the second valve 74 could be cycled in response to a thermostat in compartment 22 to regulate its cooling capacity independently from the capacity of the evaporator 68 in compartment 24. Alternately, both the bypass valve 70 and the second valve 74 could be opened for a time to reduce cooling capacity in compartment 24 while maintaining cooling in compartment 22. In the event that both compartments exceed their required capacity, the compressor could be turned off for a time as in a conventional system. In other situations, however, it may be desirable to cycle the valves at a relatively rapid rate. This rate may or may not be so rapid as to appear as a continuous modulation.

Figure 3:
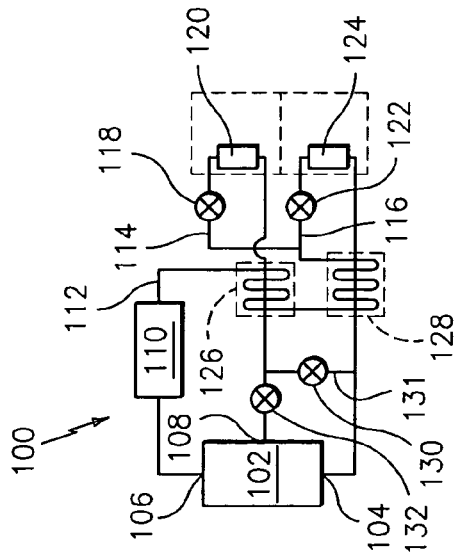
FIG. 3 is a schematic view of a second system according to principles of the invention.

FIG. 3 shows an alternate system 100 having a compressor 102 with suction, discharge, and intermediate ports 104, 106, and 108. The condenser 110 has an output conduit with a trunk 112 and branches 114 and 116. The high temperature expansion valve 118 and high temperature evaporator 120 are located in the branch 114 and the low temperature expansion valve 122 and low temperature evaporator 124 are located in the branch 116. In the exemplary embodiment, portions of the trunk 112 are in heat exchange relationship with portions of the branches 114 and 116 downstream of their associated evaporators. FIG. 3 shows this in the form of exemplary heat exchangers 126 and 128 including heat donor lengths of the trunk conduit and heat recipient lengths of the branch conduit, respectively. Along the trunk conduit, the first heat exchanger 126 is upstream of the second heat exchanger 128. As in the system 50, the system 100 includes a bypass valve 130 in a bypass conduit 131 extending from a first end at the first branch 114 and a second end at the second branch 116. Similarly, an optional second valve 132 may be positioned in the first branch 114 between the bypass conduit 131 and the intermediate port 108.

The heat exchangers 126 and 128 are crossflow, parallel flow, or counterflow heat exchangers and as shown illustrate examples of liquid-to-suction heat exchangers (LSHX) which are commonly used in refrigeration systems. In refrigeration systems with long suction lines back to the compressor or with poorly insulated suction lines or in a hot environment, there will be heat transfer from the environment into the cool suction gas flowing back to the compressor. This reduces the density of the suction gas entering the compressor and, since the compressor delivers a fixed volume flow, results in a reduction of mass flow of refrigerant through the system. This has the net result of lost cooling capacity essentially equivalent to the heat transfer into the suction line. The liquid entering the expansion valve from the condenser is often at a temperature higher than the environment and any cooling of this liquid prior to entering the expansion valve and evaporator represents increased cooling capacity in the system. The LSHX cools the liquid entering the expansion valve by transferring heat energy to the suction gas leaving the evaporator. This warms the suction gas to near-ambient levels so there is little or no additional heat transfer as the gas travels back to the compressor. The cooler liquid entering the expansion valve and evaporator result in a net increase in cooling capacity. The cooling ability of the suction gas leaving the evaporator is thus harnessed to boost system capacity instead of being lost in the suction line on the way back to the compressor. This results in improved system efficiency (this all takes place with virtually no additional compressor power) and allows for a smaller (e.g., less expensive) system to carry the cooling load.

Figure 4:
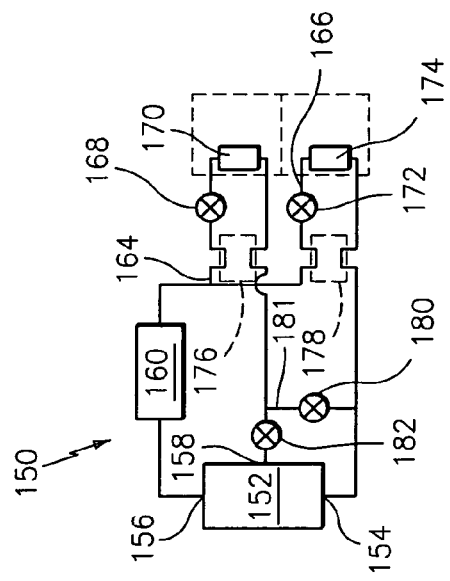
FIG. 4 is a schematic view of a third system according to principles of the invention.

FIG. 4 shows a system 150 having a compressor 152 with suction, discharge, and intermediate ports 154, 156 and 158 and a condenser 160 which may be similar to those of FIG. 3. High and low temperature expansion valves 168 and 172 and evaporators 170 and 174 also may be similar to those of FIG. 3. In the system 150, however, heat exchange is between portions of the branches 164 and 166 upstream and downstream of the valve/evaporator combinations in heat exchangers 176 and 178. As in the systems 50 and 100, a bypass valve 180 may be positioned in a bypass conduit 181 extending from a first end at the first branch 164 to a second end at the second branch 166. Similarly, an optional second valve 182 may be positioned in the first branch 164 between the bypass conduit 181 and the intermediate port 158.

Figure 5:
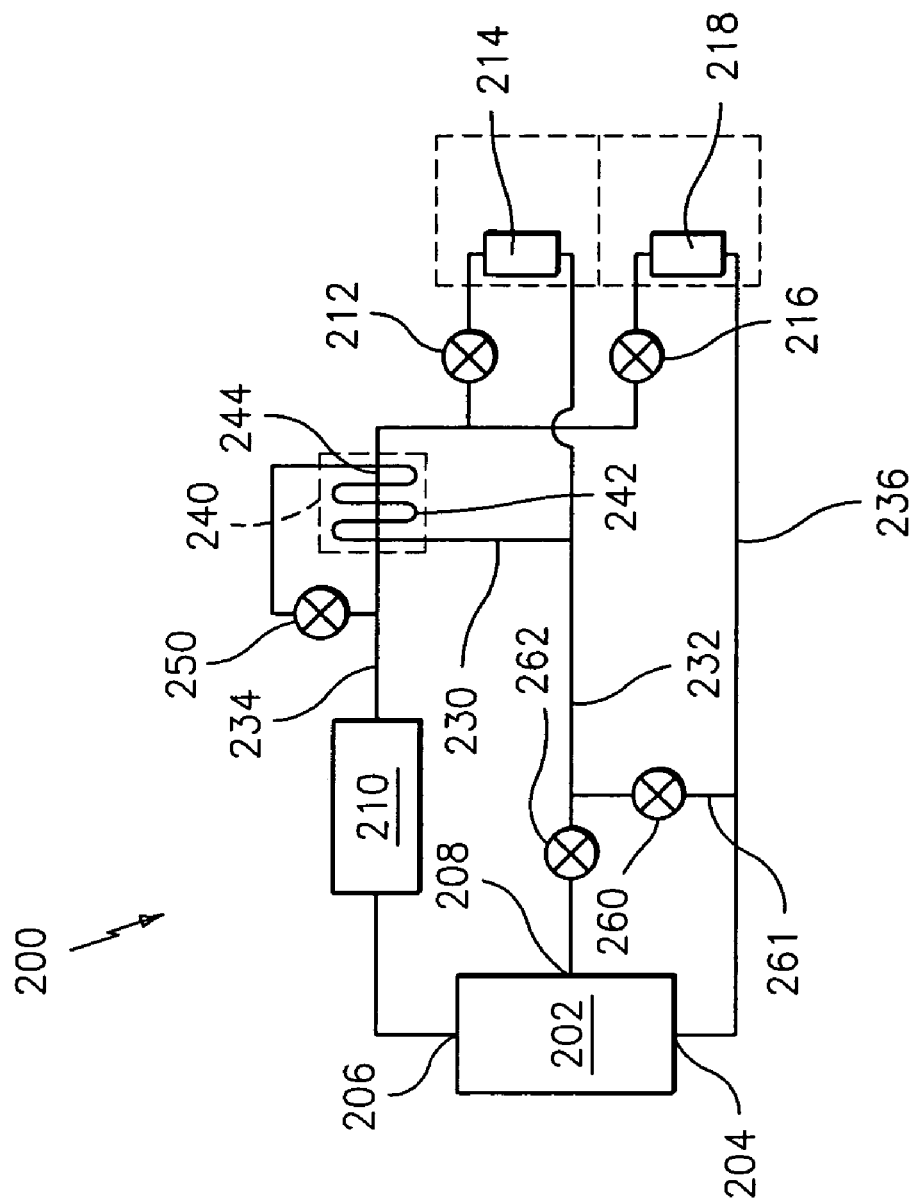
FIG. 5 is a schematic view of a fourth system according to principles of the invention.

Among various modifications are the addition of one or more economizers. FIG. 5 shows a system 200 wherein the compressor 202 has ports 204, 206, and 208 which may be generally similar to those of FIG. 2. Similarly, the condenser 210, high and low temperature expansion valves 212 and 216, and high and low temperature evaporators 214 and 218 may be similar. The system 200 includes an economizer bypass conduit 230 extending from the high temperature branch 232 between the high temperature evaporator 214 and intermediate port 208 to the trunk 234. A low temperature branch 236 extends through the low temperature expansion valve 216 and low temperature evaporator 218 to return to the suction port 204.

An economizer heat exchanger 240 contains a heat recipient length 242 of the conduit 230 and a heat donor length 244 of the trunk 234. An economizer expansion valve 250 is formed in the conduit 230 between the length 242 and the junction with the trunk 234. As in the systems 50, 100, and 150, a bypass valve 260 is located in a bypass conduit 261. The exemplary bypass conduit 261 extends from a first end at the first branch 232 between the junction with the economizer bypass conduit 230 and the intermediate port 208 to a second end at the second branch 236 between the low temperature evaporator 218 and the suction port 204. An optional second valve 262 may be positioned in the first branch 232 between the bypass conduit 261 and the intermediate port 208.

The cooling capacity of refrigerant which is diverted through economizer bypass conduit 230 is used to provide additional cooling to the main liquid flow through the trunk 234. This cooled main flow, which proceeds to the evaporators, provides increased cooling capacity. The vapor in the bypass conduit 230, which is at an intermediate pressure higher than the low temperature evaporator 218 pressure, is returned to the intermediate pressure compressor port 208 and recompressed as part of the main flow. Because only a partial compression is needed, the incremental compression power required for the increased evaporator capacity is only a part of the compression power that would be needed if a conventional circuit was used. Thus use of the economizer circuit provides increased system capacity with a less than proportional increase in power and improved overall efficiency. In a refrigeration cycle, this improvement can be quite large (e.g., ten to thirty percent or more). Alternatively, the economizer can permit a given or more moderately increased capacity to be achieved with a smaller system or can otherwise balance capacity, efficiency and size.

One or more embodiments of the present invention have been described. Nevertheless, it will be understood that various modifications may be made without departing from the spirit and scope of the invention. For example, the principles may be applied as modifications of various existing or yet-to-be developed systems. When implemented as a modification, details of the original system may influence details of any particular implementation. Accordingly, other embodiments are within the scope of the following claims.

What is claimed is:

1. An apparatus comprising:
   a compressor having an inlet and an outlet and at least a first port between the inlet and outlet;
   a condenser having an inlet coupled to the compressor outlet to receive refrigerant and having an outlet;
   a first evaporator having an inlet coupled to the condenser to receive refrigerant and having an outlet coupled to the compressor inlet;
   a second evaporator having an inlet coupled to the condenser to receive refrigerant and having an outlet coupled to the first port to return refrigerant to the compressor, bypassing a compression path between the compressor inlet and first port; and
   a bypass conduit extending between:
      a first location between the first evaporator and the compressor inlet; and
      a second location between the second evaporator and the first port;
   a first valve positioned to directly control flow through the bypass conduit; and
   a second valve positioned to directly control flow between the second location and the first port.

2. The apparatus of claim 1 wherein:
   the first and second valves are solenoid valves.

3. The apparatus of claim 1 further comprising:
   a control system coupled to the first and second valves to control operation of the first and second valves.

4. The apparatus of claim 1 wherein:
   the first and second valves are solenoid valves and are operated to substantially remain open or closed for times greater than a characteristic cycle time of the system.

5. The apparatus of claim 1 wherein:
   the compressor is a scroll-type compressor.

6. The apparatus of claim 1 having only a single such compressor.

7. The apparatus of claim 1 further comprising:
   a control system coupled to the first valve to control operation of the first valve.

8. The apparatus of claim 7 wherein the control system is configured to alternatively operate the apparatus:
   in a first mode wherein:
      the first valve is closed;
      the first evaporator maintains a first space at a first characteristic temperature; and
      the second evaporator maintains a second space at a second characteristic temperature at least 10° C. higher than the first characteristic temperature; and
   in a second mode wherein:
      the first valve is open;
      the first evaporator maintains the first space at a first characteristic temperature; and
      the second evaporator maintains a second space at a second characteristic temperature within 5° C. of the first characteristic temperature.

9. The apparatus of claim 8 wherein:
   the control system is configured to switch the system from the first mode to the second mode responsive to a setting change of a thermostat in at least one of the first and second spaces.

10. The apparatus of claim 8 wherein:
    the first and second spaces respectively are first and second spaces of a refrigerated vehicle.

11. The apparatus of claim 1 further comprising:
    at least one heat exchanger exchanging heat to refrigerant discharged by the compressor from refrigerant discharged by at least one of the first and second evaporators.

12. The apparatus of claim 1 further comprising:
    a first heat exchanger exchanging heat to refrigerant discharged by the compressor from refrigerant discharged by the first evaporator; and
    a second heat exchanger exchanging heat to refrigerant discharged by the compressor from refrigerant discharged by the second evaporator.

13. The apparatus of claim 12 wherein:
    a donor conduit of the first heat exchanger is downstream of a donor conduit of the second heat exchanger along a refrigerant flowpath portion extending downstream from the compressor.

14. The apparatus of claim 12 wherein:
    a refrigerant flowpath portion extending downstream from the compressor branches into:
       a first branch through a donor conduit of the first heat exchanger, the first evaporator, and a recipient conduit of the first heat exchanger; and
       a second branch through a donor conduit of the second heat exchanger, the second evaporator, and a recipient conduit of the second heat exchanger.

15. The apparatus of claim 1 further comprising;
an economizer having a feedback flowpath segment from downstream of the second evaporator to upstream of the first and second evaporators.

16. An apparatus comprising:
means for compressing a refrigerant having a compression path between inlet and outlet ports and an intermediate port at an intermediate location along the compression path;
a condenser;
first and second evaporators; and
means for coupling the inlet outlet, and intermediate ports, condenser, and first and second evaporators so as to:
  operate the first evaporator at a first temperature and the second evaporator at a second temperature, lower than the first temperature; and
  accommodate changes in a desired difference between the first and second temperatures, the means for coupling including:
    a bypass valve along a bypass flowpath between a first flowpath from the first evaporator to the intermediate port and a second flowpath from the second evaporator to the suction port; and
    a second valve in the first flowpath between die bypass flowpath and the intermediate port, each opening and closing of the bypass valve and second valve being responsive to at least one of a sensed condition or a user input.

17. A method for cooling first and second locations comprising:
compressing a refrigerant with a compressor having a compression path between an inlet port and an outlet port;
condensing the compressed refrigerant;
expanding a first portion of the condensed refrigerant in a first evaporator to cool the first location;
expanding a second portion of the condensed refrigerant in a second evaporator to cool the second location;
in a first mode of operation:
  returning at least a portion of refrigerant from the second evaporator to the inlet port of the compressor; and
  returning at least a portion of the refrigerant from the first evaporator to an intermediate port, between the compressor inlet and outlet ports along the compression path; and
in a second mode of operation:
  returning at least a portion of refrigerant from the first evaporator to the inlet port of the compressor; and
  returning at least a portion of the refrigerant from the second evaporator to the inlet port of the compressor.

18. The method of claim 17 further comprising:
in a third mode of operation:
  permitting a recirculating flow of refrigerant from the intermediate port to the inlet port;
  returning at least a portion of refrigerant from the first evaporator to the inlet port of the compressor; and
  returning at least a portion of the refrigerant from the second evaporator to the inlet port of the compressor.

19. The method of claim 17 wherein:
in said first mode of operation:
  essentially all refrigerant from the second evaporator is returned to the inlet port; and
  essentially all refrigerant from the first evaporator is returned to the intermediate port; and
in said second mode of operation:
  essentially all refrigerant from the first evaporator is returned to the inlet port; and
  essentially all refrigerant from the second evaporator is returned to the inlet port.

20. The method of claim 17 further comprising:
feeding back an economizer portion of the refrigerant from at least one of the first and second evaporators.

21. An apparatus comprising:
a compressor having an inlet and an outlet and at least a first port at an intermediate compression location along a compression path between the inlet and outlet;
a condenser having an inlet coupled to the compressor outlet to receive refrigerant and having an outlet;
a first evaporator having an inlet coupled to the condenser to receive refrigerant and having an outlet coupled to the compressor inlet;
a second evaporator having an inlet coupled to the condenser to receive refrigerant and having an outlet coupled to the first port to return refrigerant to the compressor, bypassing the compression pat between the compressor inlet and first port; and
a bypass conduit extending between:
  a first location between the first evaporator and the compressor inlet; and
  a second location between the second evaporator and the first port; and
a first valve positioned to directly control flow through the bypass conduit;
a first heat exchanger exchanging heat to refrigerant discharged by the compressor from refrigerant discharged by the first evaporator; and
a second heat exchanger exchanging heat to refrigerant discharged by the compressor from refrigerant discharged by the second evaporator.

* * * * *

UNITED STATES PATENT AND TRADEMARK OFFICE
CERTIFICATE OF CORRECTION

PATENT NO. : 7,353,660 B2  
APPLICATION NO. : 10/940235  
DATED : April 8, 2008  
INVENTOR(S) : Alexander Lifson et al.

It is certified that error appears in the above-identified patent and that said Letters Patent is hereby corrected as shown below:

In column 9, claim 15, line 1, after "comprising" delete the ";" and insert a --:--.

In column 9, claim 16, line 12, after "inlet" insert a --,--.

In column 9, claim 16, line 25, delete "die" and insert --the--.

In column 10, claim 21, line 35, delete "pat" and insert --path--.

Signed and Sealed this

Twelfth Day of August, 2008

JON W. DUDAS  
*Director of the United States Patent and Trademark Office*